US008869861B2

(12) United States Patent
Bouchelle et al.

(10) Patent No.: US 8,869,861 B2
(45) Date of Patent: Oct. 28, 2014

(54) DEVICE AND METHOD FOR LABELING VIALS USEFUL IN SYSTEM FOR DISPENSING PRESCRIPTIONS

(75) Inventors: Steve Bouchelle, Raleigh, NC (US); Jasper Pollard, Durham, NC (US)

(73) Assignee: Parata Systems, LLC, Durham, NC (US)

( * ) Notice: Subject to any disclaimer, the term of this patent is extended or adjusted under 35 U.S.C. 154(b) by 520 days.

(21) Appl. No.: 12/508,271

(22) Filed: Jul. 23, 2009

(65) Prior Publication Data

US 2009/0283199 A1 Nov. 19, 2009

Related U.S. Application Data

(62) Division of application No. 11/599,576, filed on Nov. 14, 2006, now abandoned.

(51) Int. Cl.

| | |
|---|---|
| ***B32B 37/02*** | (2006.01) |
| ***B65C 9/32*** | (2006.01) |
| ***B65C 3/16*** | (2006.01) |
| ***B65C 9/02*** | (2006.01) |

(52) U.S. Cl.

CPC ... *B65C 3/16* (2013.01); *B65C 9/32* (2013.01); *B65C 9/02* (2013.01)

USPC .......................................... 156/540; 156/60

(58) Field of Classification Search

CPC ................ B65C 3/16; B65C 9/02; B65C 9/32

USPC .................................................. 156/540, 60

See application file for complete search history.

(56) References Cited

U.S. PATENT DOCUMENTS

| | | | |
|---|---|---|---|
| 1,316,996 | A | 9/1919 | Applegate |
| 1,456,690 | A | 5/1923 | Goldberger |
| 1,760,859 | A | 5/1930 | Lach |

(Continued)

FOREIGN PATENT DOCUMENTS

| | | |
|---|---|---|
| CA | 936501 | 11/1973 |
| DE | 3927491 | 2/1991 |

(Continued)

OTHER PUBLICATIONS

Partial International Search Report for PCT/US2007/015458 dated Nov. 16, 2007.

*Primary Examiner* — Philip Tucker
*Assistant Examiner* — Vicki Wu
(74) *Attorney, Agent, or Firm* — Myers Bigel Sibley & Sajovec, P.A.

(57) ABSTRACT

An apparatus for applying a label to a pharmaceutical vial includes: a base having a receiving section, a labeling section, and a pick-up section; an index member attached to the base, the index member including a receiving compartment, the index member configured to receive a vial from a vial dispenser in the receiving compartment as the receiving section is positioned over the receiving section and convey the vial to the labeling section of the base; a label source positioned to present a label to a vial located in the labeling section of the base; and a labeling assembly mounted in the labeling section of the base, the labeling assembly configured to receive the vial from the index member and apply the label to the vial. The index member is further configured to convey the labeled vial from the labeling section to the pick-up section.

11 Claims, 16 Drawing Sheets

(56) References Cited

U.S. PATENT DOCUMENTS

| | | | |
|---|---|---|---|
| 1,910,327 A | 5/1933 | Gaynor | |
| 2,033,358 A | 3/1936 | Risser | |
| 2,338,852 A | 1/1944 | Hohl et al. | |
| 2,623,655 A | 12/1952 | Glans | |
| 2,665,775 A | 12/1954 | Smith | |
| 2,708,996 A | 5/1955 | Skillman | |
| 2,749,003 A | 6/1956 | Zimmermann | |
| 2,865,532 A | 12/1958 | Smith | |
| 3,023,851 A | 3/1962 | Stiller | |
| 3,144,958 A | 8/1964 | Gumpertz | |
| 3,160,793 A | 12/1964 | Colburn et al. | |
| 3,179,288 A | 4/1965 | Davy | |
| 3,185,851 A | 5/1965 | D'Emilio | |
| 3,196,276 A | 7/1965 | Naab | |
| 3,206,062 A | 9/1965 | Rappaport | |
| 3,310,199 A | 3/1967 | Roberts et al. | |
| 3,312,372 A | 4/1967 | Cooper, Jr. | |
| 3,410,450 A | 11/1968 | Fortenberry | |
| 3,417,542 A | 12/1968 | Merrill et al. | |
| 3,436,736 A | 4/1969 | Platt et al. | |
| 3,440,798 A | 4/1969 | Rackley | |
| 3,532,583 A | 10/1970 | Thiele | |
| 3,556,342 A | 1/1971 | Guarr | |
| 3,599,152 A | 8/1971 | Williams | |
| 3,618,642 A | 11/1971 | Beaulieu | |
| 3,653,176 A | 4/1972 | Gess | |
| 3,674,040 A | 7/1972 | Howells | |
| 3,730,388 A | 5/1973 | Bender | |
| 3,732,544 A | 5/1973 | Obland | |
| 3,771,284 A | 11/1973 | Boeckmann et al. | |
| 3,780,907 A | 12/1973 | Colburn et al. | |
| 3,815,780 A | 6/1974 | Bauer | |
| 3,837,139 A | 9/1974 | Roseberg | |
| 3,855,759 A | 12/1974 | Pohlenz | |
| 3,885,702 A | 5/1975 | Joslin et al. | |
| 3,917,045 A | 11/1975 | Williams et al. | |
| 3,975,886 A | 8/1976 | Waters | |
| 4,045,276 A | 8/1977 | Zodrow | |
| 4,075,820 A | 2/1978 | Standley | |
| 4,111,738 A * | 9/1978 | Amberg | 156/458 |
| 4,132,318 A | 1/1979 | Wang et al. | |
| 4,186,542 A | 2/1980 | Oyagi | |
| 4,188,843 A | 2/1980 | Dickey | |
| 4,267,942 A | 5/1981 | Wick, Jr. et al. | |
| 4,275,856 A | 6/1981 | Harvey | |
| 4,414,056 A | 11/1983 | Buchholz et al. | |
| 4,434,602 A | 3/1984 | Culpepper | |
| 4,546,901 A | 10/1985 | Buttarazzi | |
| 4,567,714 A | 2/1986 | Chasman | |
| 4,573,606 A | 3/1986 | Lewis et al. | |
| 4,654,727 A | 3/1987 | Blum et al. | |
| 4,655,026 A | 4/1987 | Wigoda | |
| 4,664,289 A | 5/1987 | Shimizu | |
| 4,674,259 A | 6/1987 | Hills | |
| 4,674,651 A | 6/1987 | Scidmore et al. | |
| 4,693,057 A | 9/1987 | Rittinger et al. | |
| 4,695,954 A | 9/1987 | Rose et al. | |
| 4,709,798 A | 12/1987 | Herzog | |
| 4,766,542 A | 8/1988 | Pilarczyk | |
| 4,767,023 A | 8/1988 | Hackmann et al. | |
| 4,805,377 A | 2/1989 | Carter | |
| 4,846,619 A | 7/1989 | Crabtree et al. | |
| 4,869,392 A | 9/1989 | Moulding, Jr. et al. | |
| 4,918,604 A | 4/1990 | Baum | |
| 4,971,513 A | 11/1990 | Bergerioux et al. | |
| 4,980,292 A | 12/1990 | Elbert et al. | |
| 4,984,709 A | 1/1991 | Weinstein | |
| 5,018,644 A | 5/1991 | Hackmann et al. | |
| 5,047,948 A | 9/1991 | Turner | |
| 5,479,762 A | 1/1996 | Bliss | |
| 5,571,325 A | 11/1996 | Ueyama et al. | |
| 5,771,657 A | 6/1998 | Lasher et al. | |
| 5,798,020 A | 8/1998 | Coughlin et al. | |
| 6,016,291 A | 1/2000 | Joos | |
| 6,102,246 A | 8/2000 | Goulet et al. | |
| 6,119,737 A | 9/2000 | Yuyama et al. | |
| 6,189,733 B1 | 2/2001 | Nemoto et al. | |
| RE37,829 E | 9/2002 | Charhut et al. | |
| 6,519,913 B2 | 2/2003 | Higashizaki et al. | |
| 6,631,826 B2 | 10/2003 | Pollard et al. | |
| 6,752,189 B2 | 6/2004 | Oldenburg et al. | |
| 7,100,796 B1 | 9/2006 | Orr et al. | |
| 7,118,006 B2 | 10/2006 | Williams et al. | |
| 7,954,531 B2 | 6/2011 | Yuyama et al. | |
| 2004/0004085 A1 * | 1/2004 | Williams et al. | 221/278 |
| 2005/0067111 A1 | 3/2005 | Geurtsen | |
| 2006/0277269 A1 | 12/2006 | Dent et al. | |
| 2007/0102109 A1 | 5/2007 | Katritzky et al. | |

FOREIGN PATENT DOCUMENTS

| | | |
|---|---|---|
| EP | 0344932 | 12/1989 |
| EP | 0571980 | 5/1993 |
| GB | 1168758 | 10/1969 |
| GB | 1411951 | 10/1973 |
| JP | 63-208410 | 8/1988 |
| JP | 64-28102 | 1/1989 |
| JP | 1-288265 | 11/1989 |
| JP | 2-28417 | 1/1990 |

* cited by examiner

DEVICE AND METHOD FOR LABELING VIALS USEFUL IN SYSTEM FOR DISPENSING PRESCRIPTIONS

CROSS-REFERENCE TO RELATED APPLICATIONS

This application is a divisional application of U.S. patent application Ser. No. 11/599,576, filed Nov. 14, 2006 now abandoned entitled Device and Method for Labeling Vials Useful in System for Dispensing Prescriptions, the entirety of which is hereby incorporated by reference.

FIELD OF THE INVENTION

The present invention is directed generally to the dispensing of prescriptions of pharmaceuticals, and more specifically is directed to the automated dispensing of pharmaceuticals.

BACKGROUND OF THE INVENTION

Pharmacy generally began with the compounding of medicines, which entailed the actual mixing and preparing of medications. Heretofore, pharmacy has been, to a great extent, a profession of dispensing, that is, the pouring, counting, and labeling of a prescription, and subsequently transferring the dispensed medication to the patient. Because of the repetitiveness of many of the pharmacist's tasks, automation of these tasks has been desirable.

Some attempts have been made to automate the pharmacy environment. Different exemplary approaches are shown in U.S. Pat. No. 5,337,919 to Spaulding et al. and U.S. Pat. Nos. 6,006,946; 6,036,812 and 6,176,392 to Williams et al. The Williams system conveys a bin with tablets to a counter and a vial to the counter. The counter dispenses tablets to the vial. Once the tablets have been dispensed, the system returns the bin to its original location and conveys the vial to an output device. Tablets may be counted and dispensed with any number of counting devices. Drawbacks to these systems typically include the relatively low speed at which prescriptions are filled and the absence in these systems of securing a closure (i.e., a lid) on the container after it is filled.

One additional automated system for dispensing pharmaceuticals is described in some detail in U.S. Pat. No. 6,971,541 to Williams et al. This system has the capacity to select an appropriate vial, label the vial, fill the vial with a desired quantity of a selected pharmaceutical tablet, apply a cap to the filled vial, and convey the labeled, filled, capped vial to an offloading station for retrieval.

Although this particular system can provide automated pharmaceutical dispensing, certain of the operations may be improved. For example, the speed and precision with which labels are applied to a vial may be improved. In particular, the Williams et al. system relies on a first robotic arm to maneuver an empty vial from a vial dispenser to a labeler, and a second robotic arm to convey the empty labeled vial from the labeler to a bin that dispenses pharmaceutical tablets. It may be desirable to eliminate the first robotic arm in order to improve the speed and reliability of the system.

SUMMARY OF THE INVENTION

As a first aspect, embodiments of the present invention are directed to an apparatus for applying a label to a pharmaceutical vial. The apparatus comprises: a base having a receiving section and a labeling section; an index member attached to the base, the index member including a receiving compartment, the index member configured to receive a vial from a vial dispenser in the receiving compartment as the receiving section is positioned over the receiving section and convey the vial to the labeling section of the base; a label source positioned to present a label to a vial located in the labeling section of the base; and a labeling assembly mounted in the labeling section of the base, the labeling assembly configured to receive the vial from the index member and rotate the vial as the label is presented to the vial to apply the label to the vial. In this configuration, the same component can both receive the vial from the vial dispenser and convey it to the labeling assembly for application of the label.

As a second aspect, embodiments of the present invention are directed to an apparatus for applying a label to a pharmaceutical vial, comprising: a base having a receiving section, a labeling section, and a pick-up section; an index member attached to the base, the index member including a receiving compartment, the index member configured to receive a vial from a vial dispenser in the receiving compartment as the receiving section is positioned over the receiving section and convey the vial to the labeling section of the base; a label source positioned to present a label to a vial located in the labeling section of the base; and a labeling assembly mounted in the labeling section of the base, the labeling assembly configured to receive the vial from the index member and apply the label to the vial. The index member is further configured to convey the labeled vial from the labeling section to the pick-up section. In this configuration, a common index member can convey a vial from a vial dispensing station to the labeler and subsequently to a carrier for dispensing of pharmaceuticals.

As a third aspect, embodiments of the present invention are directed to an apparatus for applying a label to a pharmaceutical vial, comprising: a base having a labeling section and a pick-up section; an index member attached to the base, the index member including a receiving compartment; a label source positioned to present a label to a vial located in the labeling section of the base; and a labeling assembly mounted in the labeling section of the base, the labeling assembly configured to receive the vial from the index member and apply the label to the vial. The index member is further configured to convey the labeled vial from the labeling section to the pick-up section. In this configuration, a single index member can convey a labeled vial from the labeling assembly to a pick-up station for retrieval by a carrier that takes the labeled vial to a pharmaceutical dispenser for dispensing.

As a fourth aspect, embodiments of the present invention are directed to a labeling assembly for use with a vial labeling apparatus. The labeling assembly includes: a generally horizontal base; a drive roller unit mounted to the base, the drive roller unit including a drive roller that is rotatable relative to the base about a first generally vertical axis of rotation and a drive unit that drives the drive roller about the first axis of rotation; an idler roller unit mounted to the base, the idler roller unit including an idler roller that is rotatable relative to the base about a second generally vertical axis of rotation; and a swing wheel unit mounted to the base. The swing wheel unit includes a shaft and a swing wheel that is rotatable relative to the shaft about a third generally vertical axis of rotation defined by the shaft, the shaft being pivotally mounted in the base for rotation about a generally horizontal axis of rotation, such that the position of the swing wheel relative to the drive roller unit and the idler roller unit can be modified to accommodate different sizes of pharmaceutical vials for labeling.

As a fifth aspect, embodiments of the present invention are directed to a method of labeling a pharmaceutical vial. The method comprises the steps of: receiving a pharmaceutical vial from a dispenser of pharmaceutical vials in a receiving section; conveying the vial with an index member to a labeling section adjacent a labeling source; applying a label presented by the labeling source to the vial; conveying the labeled vial with the index member away from the labeling section to a pick-up section; and removing the labeled vial from the pick-up section. This method employs a common index member to convey the vial from a vial dispenser to a labeling station for labeling, then from the labeling station to a pick-up location for retrieval by a carrier for subsequent filling with pharmaceuticals.

DETAILED DESCRIPTION OF EMBODIMENTS OF THE INVENTION

Figure 1:
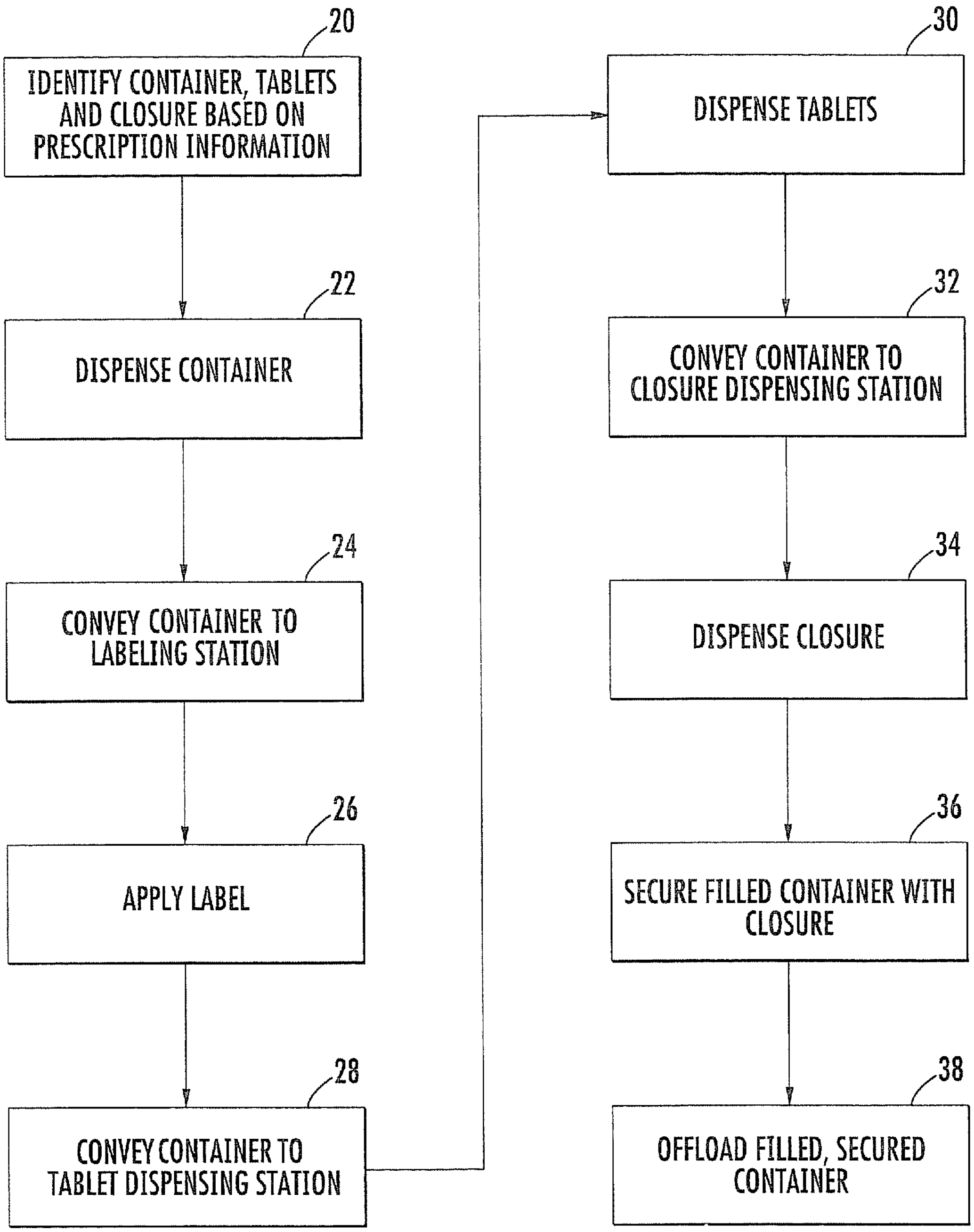
FIG. 1 is a flow chart illustrating an embodiment of a method according to the present invention.

The present invention will now be described more fully hereinafter, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout. Thicknesses and dimensions of some components may be exaggerated for clarity.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the expression "and/or" includes any and all combinations of one or more of the associated listed items.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Well-known functions or constructions may not be described in detail for brevity and/or clarity.

As described above, the invention relates generally to a system and process for dispensing pharmaceuticals. An exemplary process is described generally with reference to FIG. 1. The process begins with the identification of the proper container, tablets or capsules and closure to be dispensed based on a patient's prescription information (Box 20). A container of the proper size is dispensed at a container dispensing station (Box 22), then is conveyed to a labeling station (Box 24). The labeling station applies a label (Box 26), after which the container is conveyed to a tablet dispensing station (Box 28), from which the designated tablets are dispensed in the designated amount into the container (Box 30). The filled container is then moved to a closure dispensing station (Box 32), where a closure of the proper size has been dispensed (Box 34). The filled container is secured with a closure (Box 36), then transported to an offload station and offloaded (Box 38).

Figure 2:
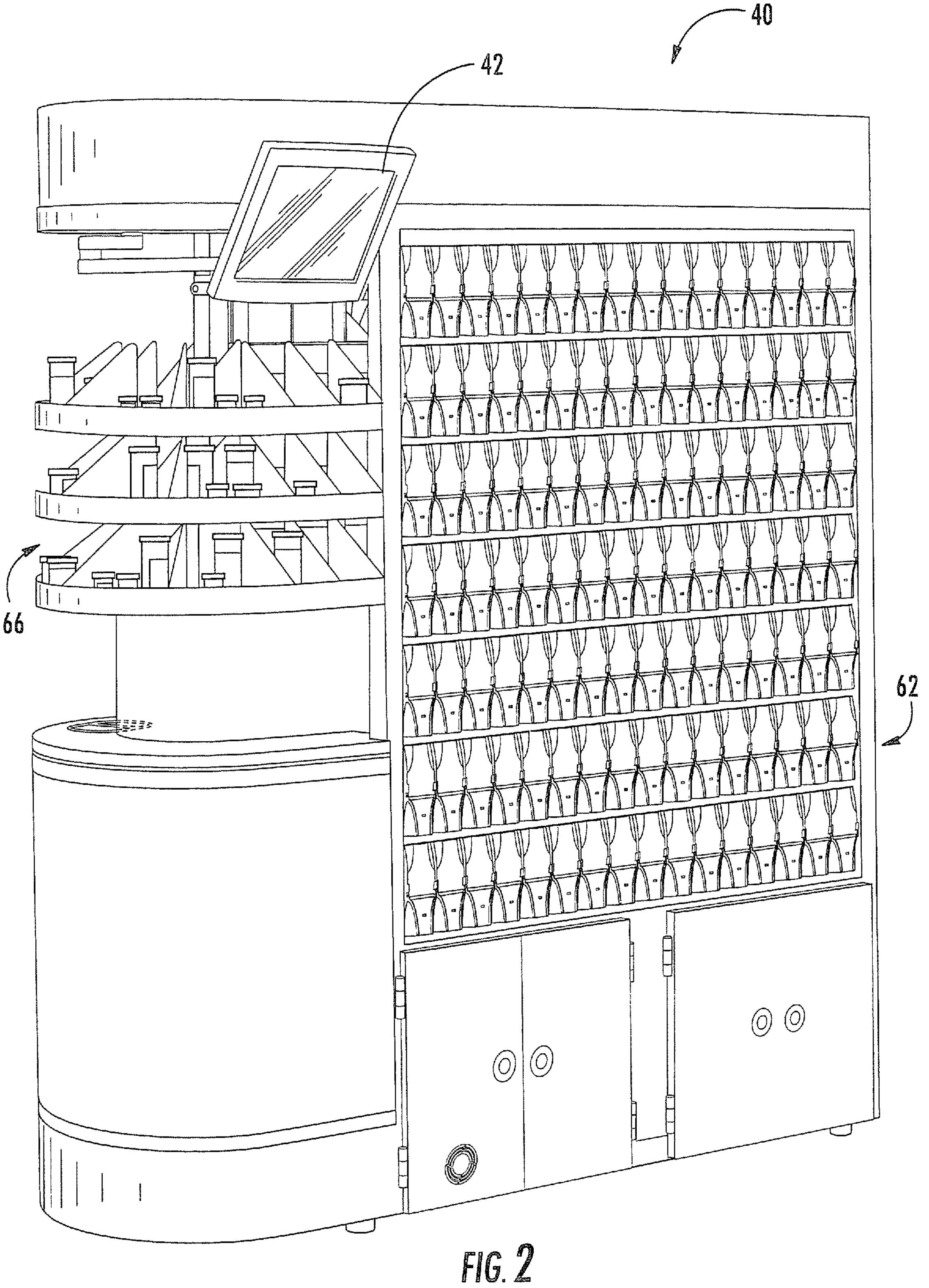
FIG. 2 is a front perspective view of a pharmaceutical tablet dispensing system according to the present invention.
Figure 3:
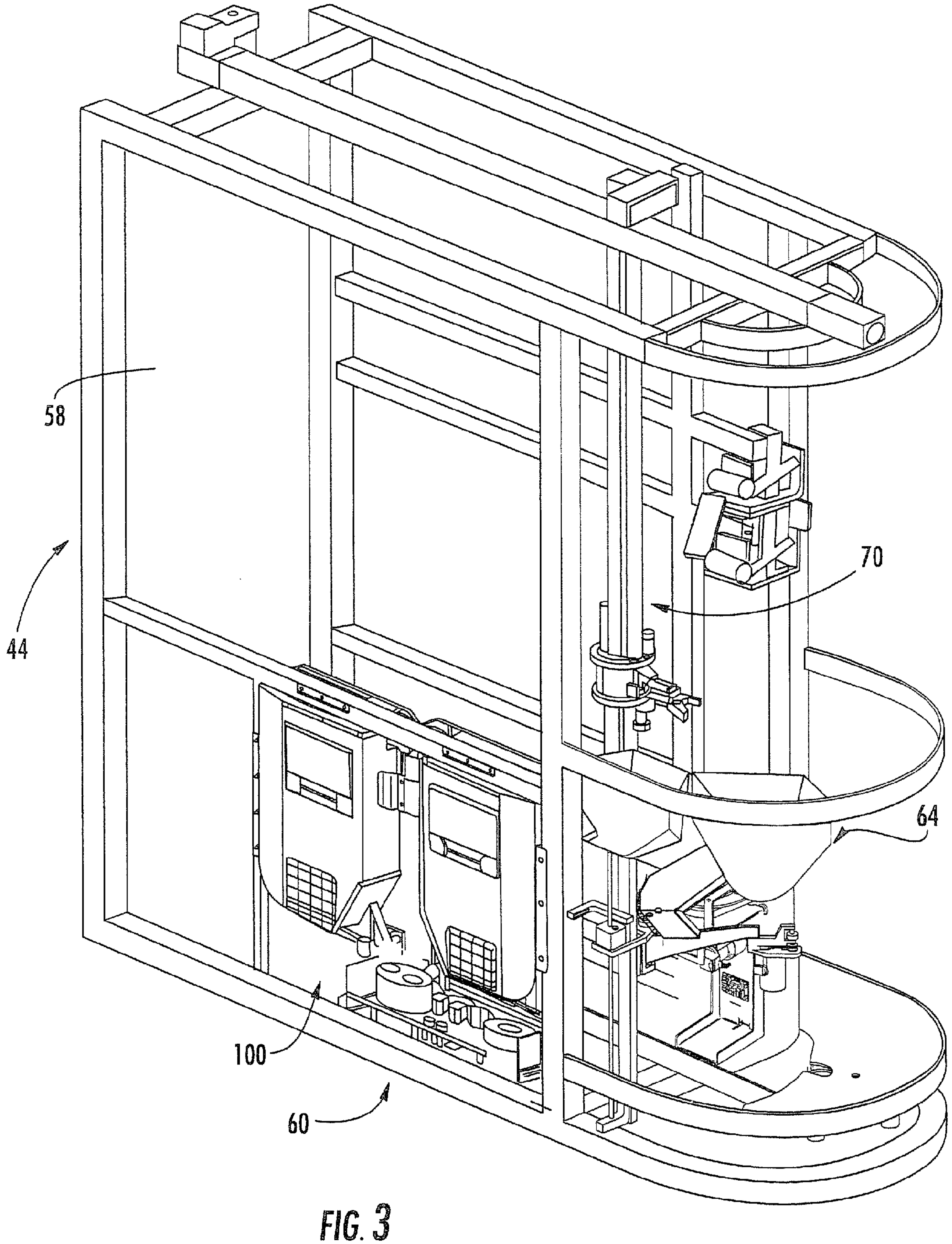
FIG. 3 is a rear cutaway perspective view of the system of FIG. 2 illustrating the support frame, the container dispensing station, the labeling station, the dispensing carrier, and the closure dispensing station.

A system that can carry out this process is illustrated in FIGS. 2 and 3 and designated broadly therein at 40. The system 40 includes a support frame 44 for the mounting of its various components. The system 40 generally includes as operative stations a controller 42, a container dispensing station 58, a labeling station 100, a tablet dispensing station 62, a closure station 64, and an offloading station 66. In the illustrated embodiment, containers, tablets and closures are moved between these stations with a dispensing carrier 70; however, in some embodiments multiple carriers may be employed. With the exception of the labeling station 100, which is described in detail below, examples of each of the other operative stations and the conveying devices are described in detail in U.S. Pat. No. 6,971,541 to Williams et al., the disclosure of which is hereby incorporated herein in its entirety, and/or in co-pending and co-assigned U.S. patent application Ser. No. 11/599,526, filed concurrently, entitled DEVICE FOR DISPENSING VIALS USEFUL IN SYSTEM AND METHOD FOR DISPENSING PRESCRIPTIONS.

Figure 4:
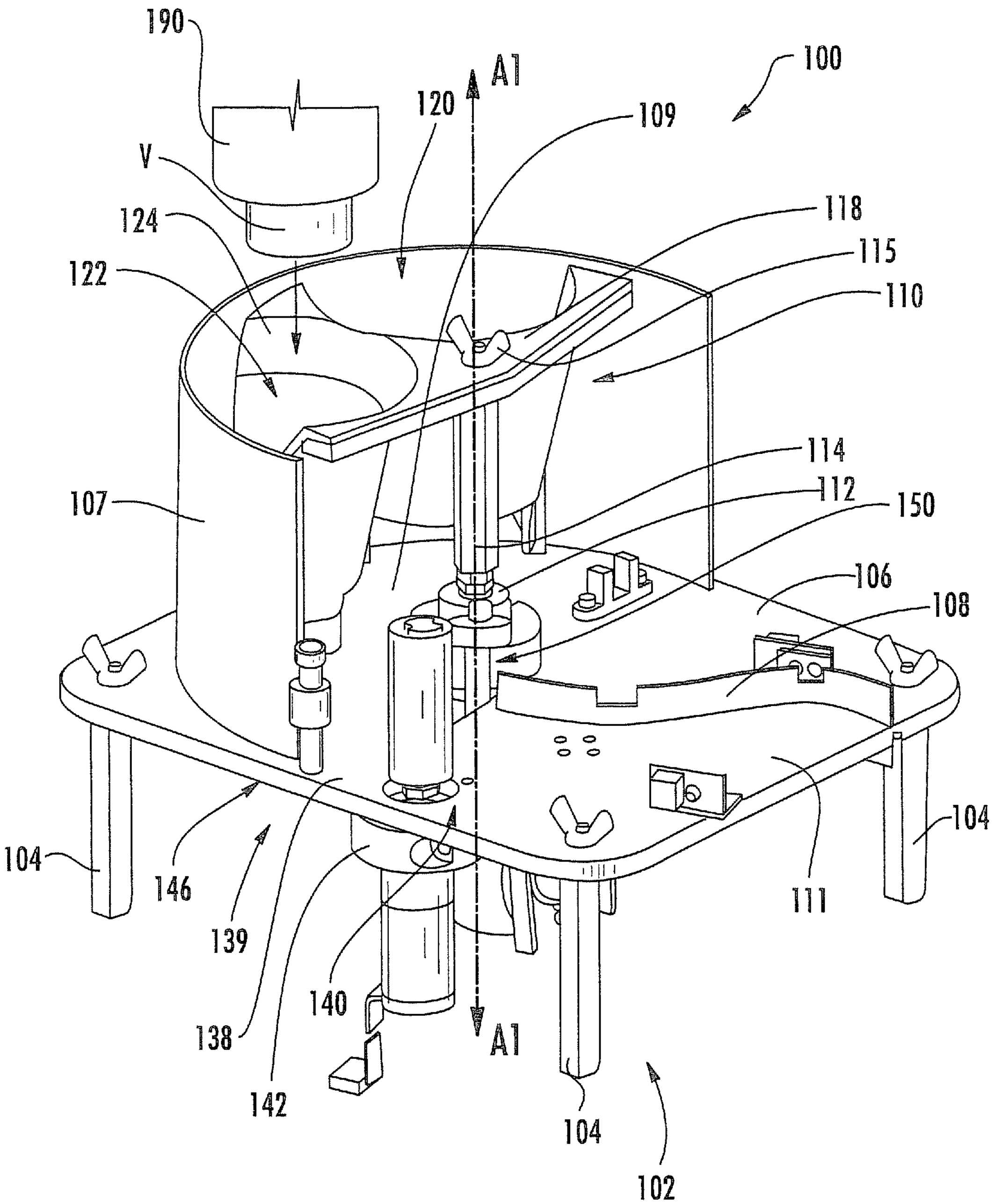
FIG. 4 is a front perspective view of a vial labeling station according to embodiments of the present invention.

Referring now to FIG. 4, the labeling station 100 is shown therein. The labeling station 100 includes a base 102, an index member assembly 110, and a labeling assembly 139. These components are described in greater detail below.

Figure 5:
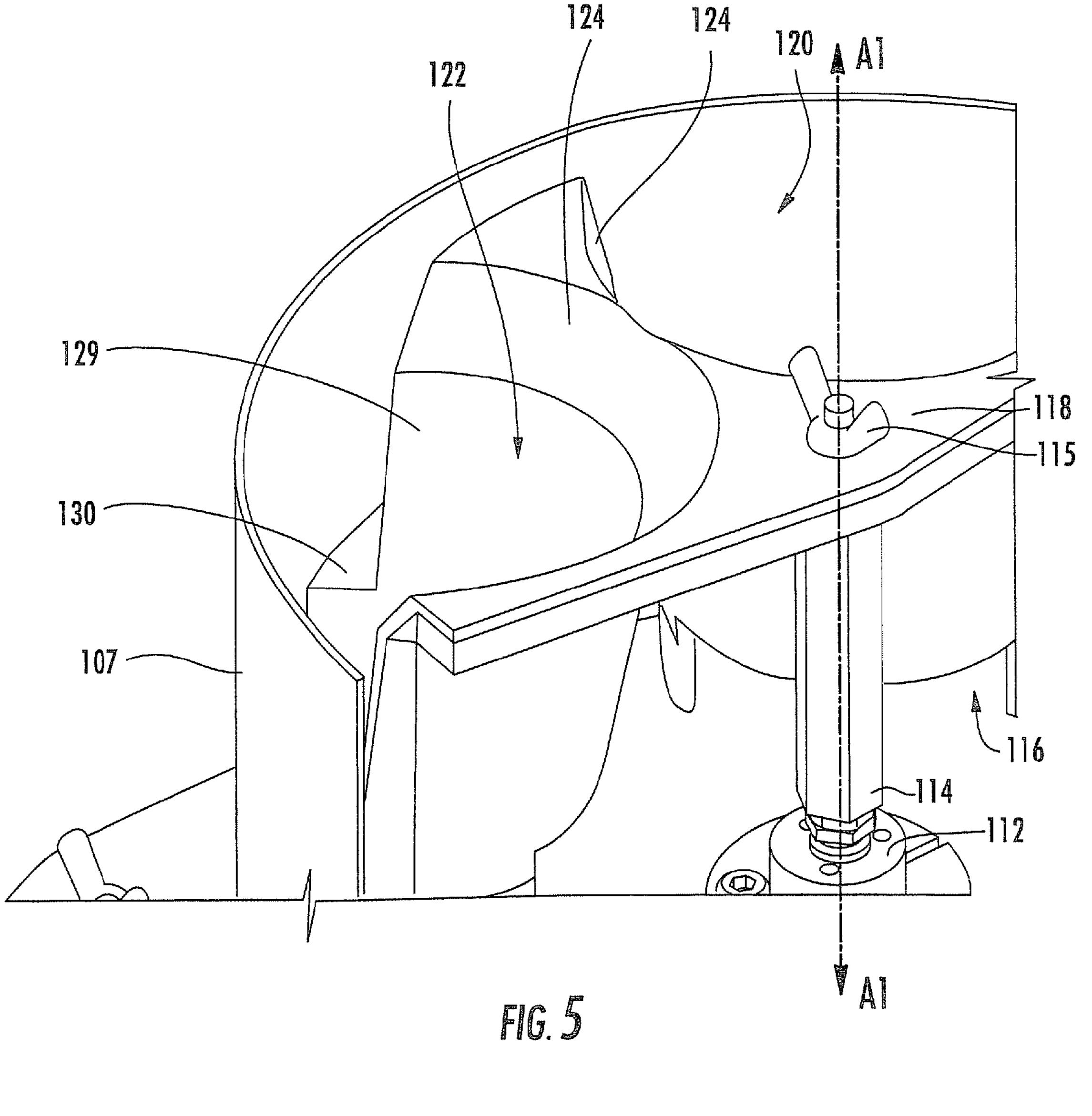
FIG. 5 is an enlarged perspective view of the index member of the vial labeling station of FIG. 4.
Figure 7:
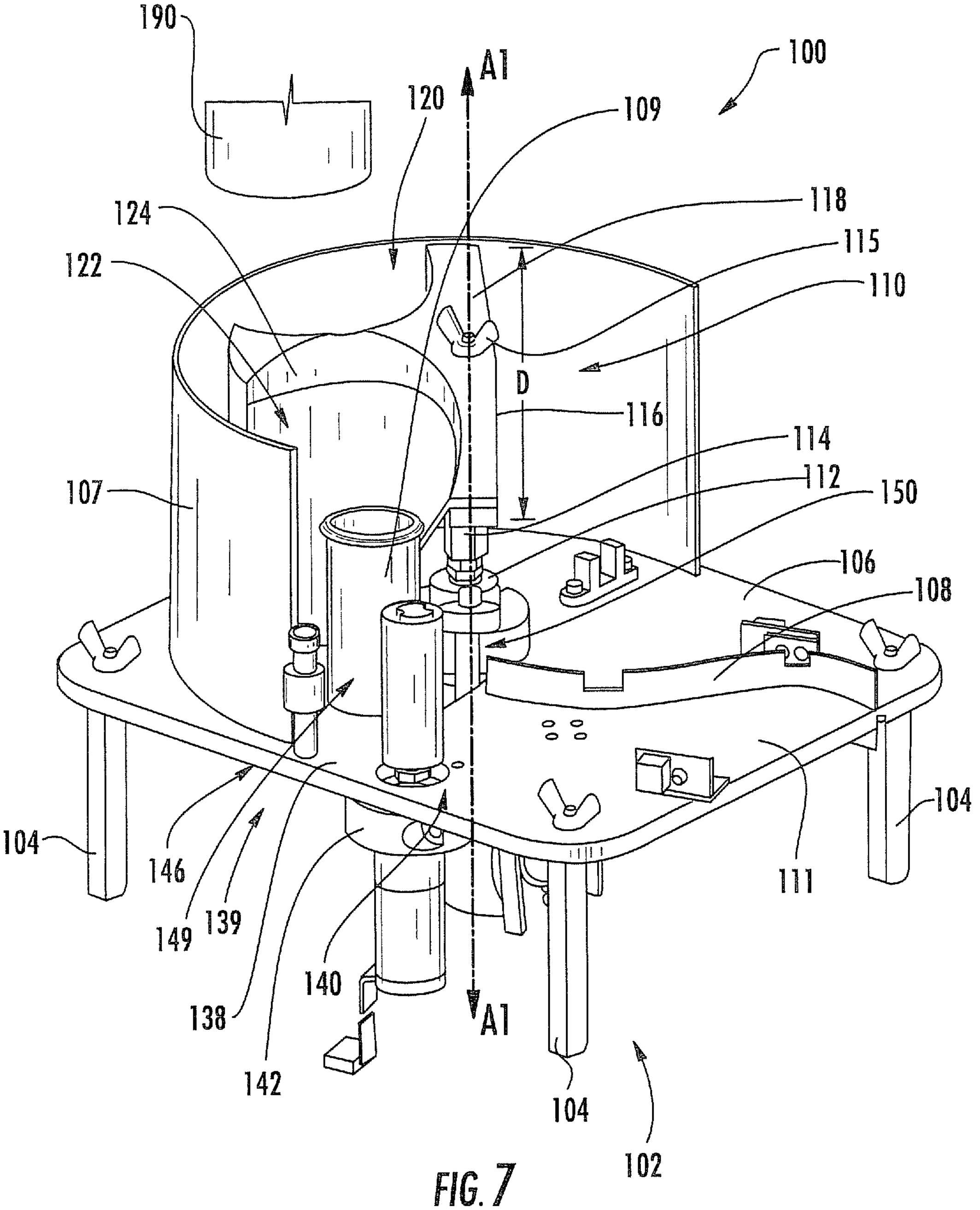
FIG. 7 is a front perspective view of the vial labeling station of FIG. 4 showing the index member moving a vial to the labeling station.

Referring again to FIG. 4 and also to FIGS. 5 and 7, the base 102 includes a base plate 106 supported from underneath by legs 104. Typically, the base plate 106 is generally planar. In the illustrated embodiment, the base plate 106 is slightly angled relative to the underlying surface, with the labeling assembly 139 being on the higher end; an angle of between about 0.5 and 2.0 degrees is typical. A semicircular drop guide 107 is positioned on one end of the upper surface of the base plate 106, with the center of its arc located near the center of the base plate 106. A receiving section 109 can be defined within the drop guide 107. An exit guide 108 extends along a curved path from a point near the center of the base plate 106 away from the drop guide 107 toward the opposite end of the base plate 106. A pick-up section 111 is located near the end of the exit guide 108. A labeling section 138 is positioned generally between the receiving section 109 and the pick-up section 111, with the labeling assembly 139 being mounted thereon.

Referring again to FIGS. 4 and 5, the index member assembly 110 includes an index motor 112 and an index member 116 (shown as generally one half of a wheel). The index motor 112 is mounted to the base plate 106 at or near the center thereof. A hexagonal shaft 114 extends upwardly from the motor 112. The index member 116 includes a top panel 118 that is generally horizontally disposed. The underside of the top panel 118 includes a hexagonal recess (not shown) that receives the shaft 114 of the index motor 112 and causes the index member 116 to rotate with the shaft 114. The index member 116 is attached to the shaft 114 via a locking device 115 positioned atop the top panel 118. Consequently, the index member 116 is rotatable relative to the base plate 106 about a generally vertical axis A1 that passes through the shaft 114.

Figure 6:
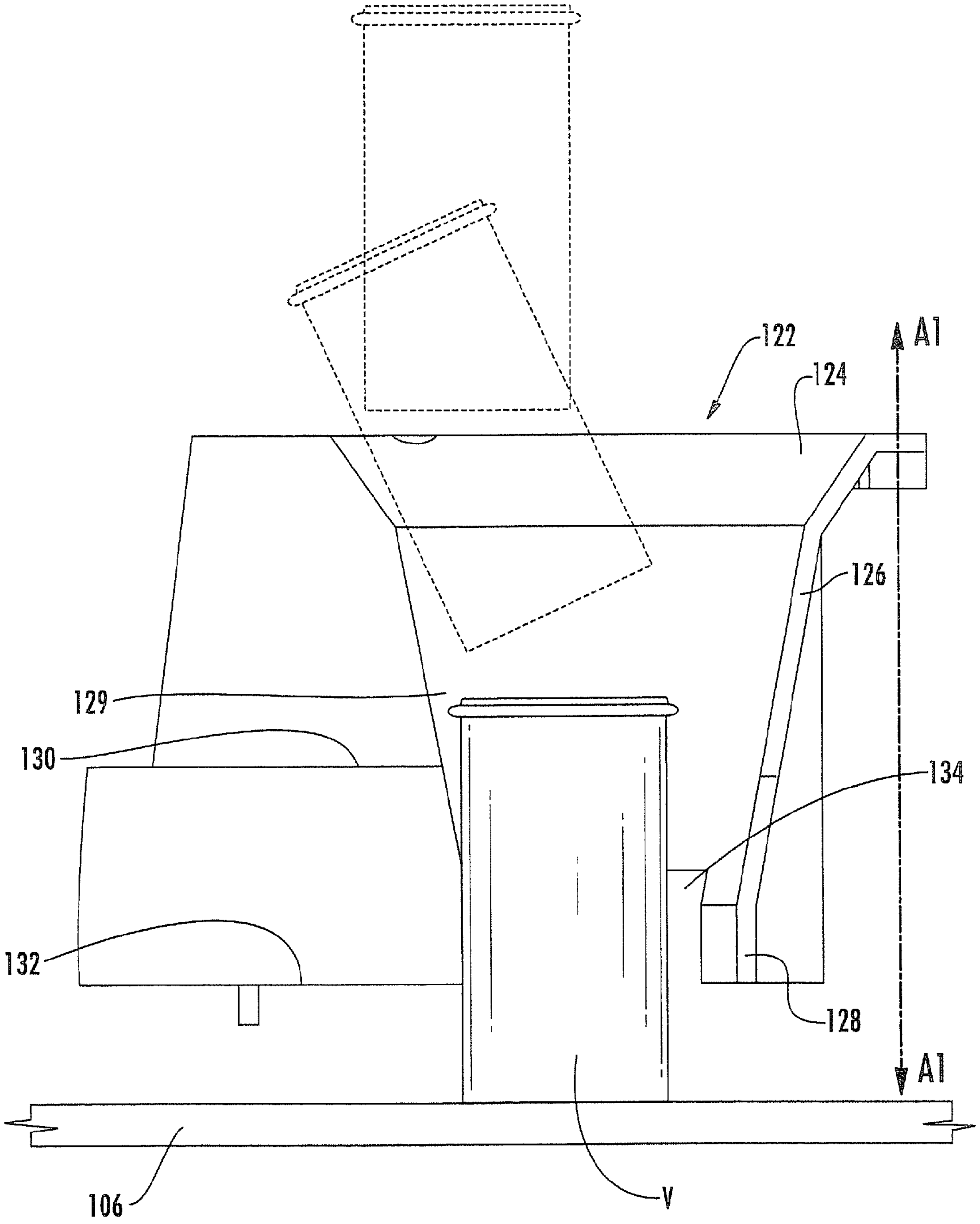
FIG. 6 is a front view of the index member of FIG. 5.

Referring again to FIGS. 4 and 5 and also to FIG. 6, the index member 116 includes two receiving compartments: a large vial compartment 120 and a small vial compartment 122. Each of the compartments 120, 122 includes an upper beveled surface 124 that merges with the top panel 118 and extends downwardly therefrom, a chamfered surface 126 that merges with and extends downwardly from the beveled surface 124, and a lower wall 128 that merges with and extends downward from the chamfered surface 126; the result is a generally conically-shaped wall that extends over an arc of approximately 150 degrees and defines the radially inward wall of the chambers 120, 122. Each of the compartments 120, 122 may be sized to receive vials of a particular size range; for example, the large vial compartment 120 may have a diameter of about 2 inches and be particularly suitable for receiving vials having a diameter of between 1.7 and 2.2 inches, and the small vial compartment 122 may have a diameter of about 1.5 inches and be particularly suitable for receiving vials having a diameter of between 1.0 and 1.7 inches. The drop guide 107 described above provides the radially outward wall of each of the chambers 120, 122.

Referring now to FIG. 6, a lagging edge portion 129 of the chamfered surface 126 has a stepped profile 130, such that the lower section thereof extends farther from the axis A1 than does the upper section. The lowermost edge 132 of the lower wall 128 is raised above the base plate 106 at a height sufficient to clear the exit guide 108 when the index member 116 rotates. Also, each compartment 120, 122 includes a cutout 134 that extends upwardly from the lowermost edge 132.

Figure 8:
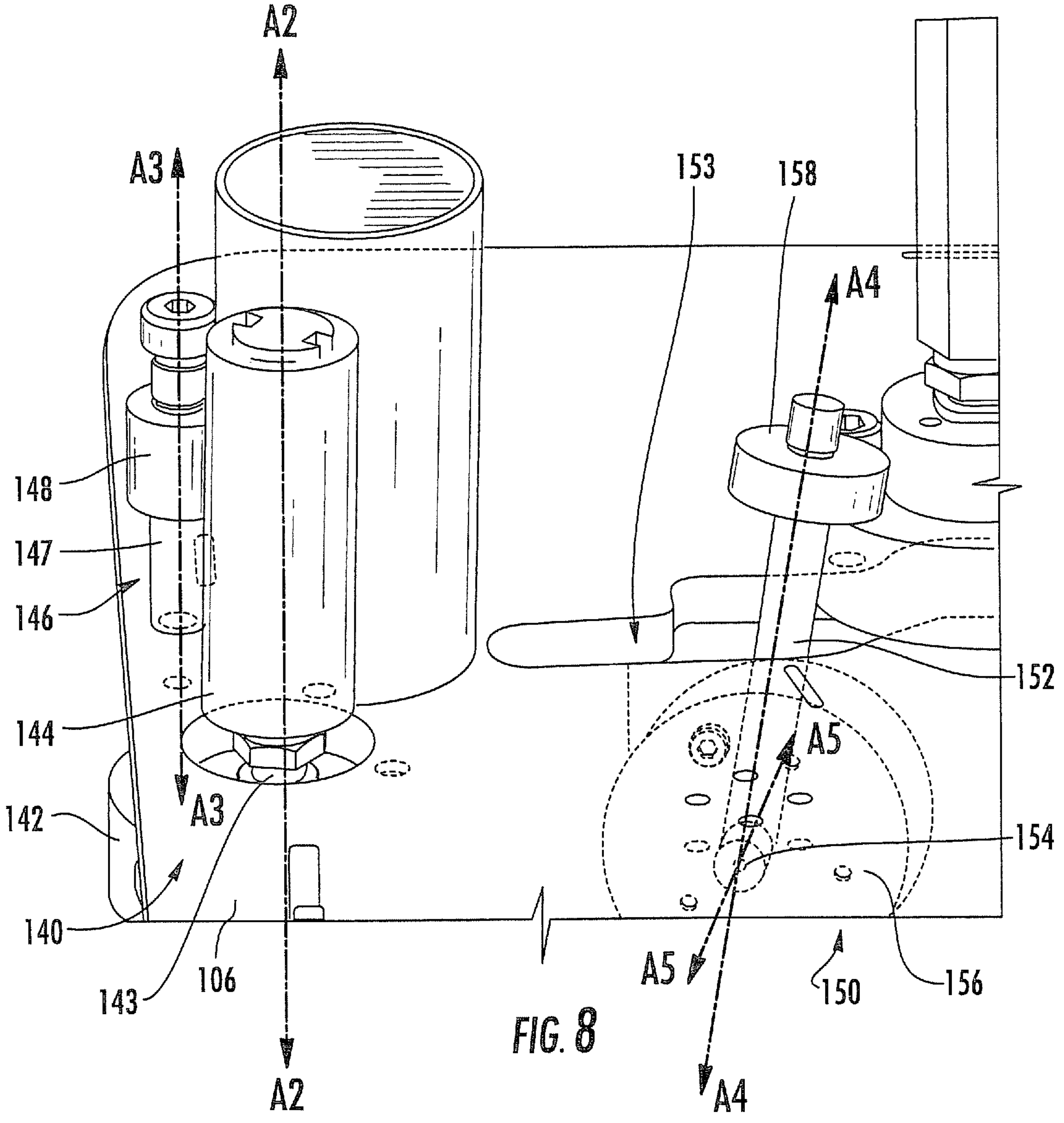
FIG. 8 is a front perspective view of the labeling section of the vial labeling station of FIG. 4 illustrating the swing roller unit in the retracted position.

Turning now to FIG. 8, the base plate 106 also includes a labeling section 138, in which the application of labels to vials occurs via the labeling assembly 139. The labeling assembly 139 includes a drive roller unit 140, an idler roller unit 146, and a swing idler wheel unit 150 mounted in the labeling section 138. These components are described in greater detail below.

Figure 9:
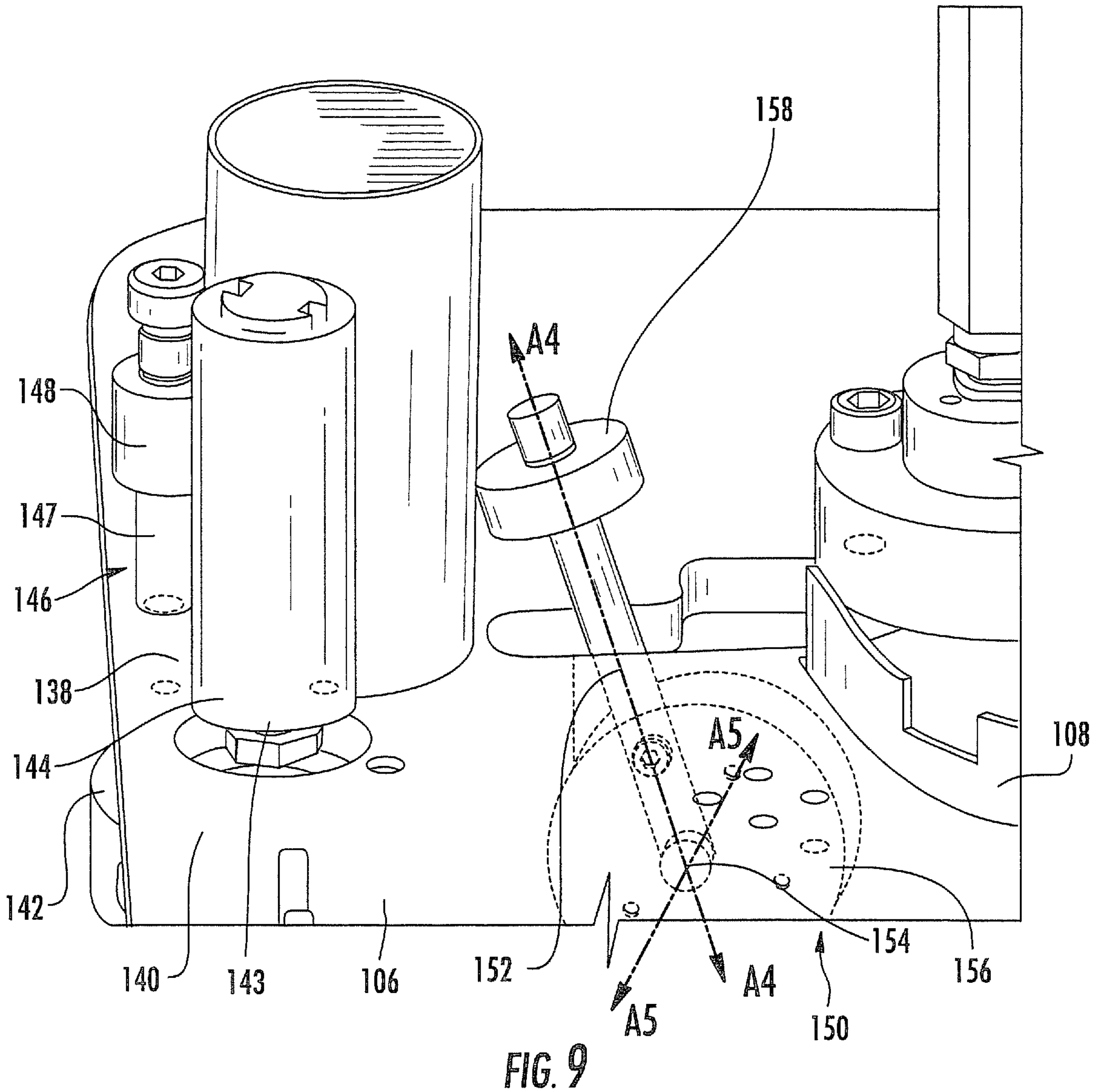
FIG. 9 is a front perspective view of the labeling section of FIG. 8 illustrating the swing roller unit in the engaged position.

The drive roller unit 140 (FIGS. 8 and 9) includes a motor 142 that is mounted to the base plate 106. A shaft 143 extends upwardly from the motor 142 through an aperture in the base plate 106. A drive roller 144 is positioned on and fixed to the shaft 143 for rotation about a generally vertical axis of rotation A2 defined by the shaft 143. The drive roller 144 is typically formed of a polymeric material such as urethane, may have a diameter of between about 0.5 and 1.0 inches, and is typically about 1.5 to 2.0 inches in length (which length may correspond to the length of a label to be applied to a vial).

Referring again to FIGS. 8 and 9, the idler roller unit 146 includes a shaft 147 that, in this embodiment, is mounted in the base plate 106 nearer to the edge of the drop guide 107 than is the drive roller unit 140. The idler roller unit 146 also includes an idler roller 148 that is mounted to the shaft 147 and rotatable relative thereto about a generally vertical axis of rotation A3 defined by the shaft 147. The idler roller 148 is typically between about 0.25 and 0.5 inches in diameter, such that there is a label gap 149 of between about 1 and 2 inches between the idler roller 148 and the drive roller 144.

The swing idler wheel unit 150 includes a shaft 152 and a swing idler wheel 158 that rotates relative to the shaft 152 about an axis of rotation A4 defined by the shaft 152. The shaft 152 extends through a slot 153 in the base plate 106 and is mounted in the illustrated embodiment to a rotary solenoid 156 that is mounted, in turn, to a bracket (not shown) fixed to the underside of the base plate 106. The shaft 152 is pivotable via the rotary solenoid 156 about a generally horizontal axis of rotation A5 defined by a pivot 154 on the solenoid 156 over a range of between about 25 and 45 degrees, which in turn enables the wheel 158 to move toward and away from the drive roller 144 and the idler roller 148 about 1 to 2 inches. The swing idler wheel 158 typically has a diameter of between about 0.25 and 0.75 inches.

Figure 11:
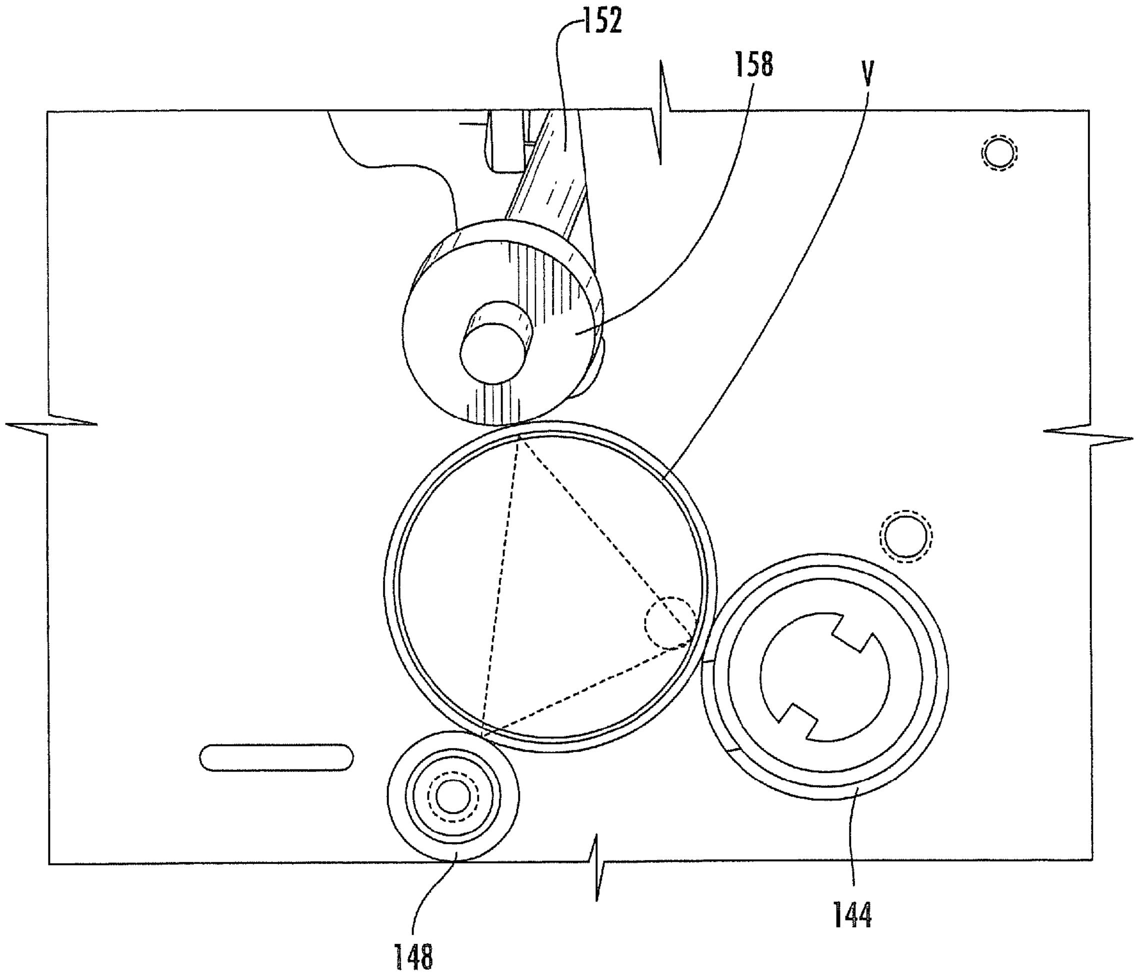
FIGS. 11 and 12 are top views of the labeling section of FIG. 8 showing how vials of different sizes can be accommodated.
Figure 12:
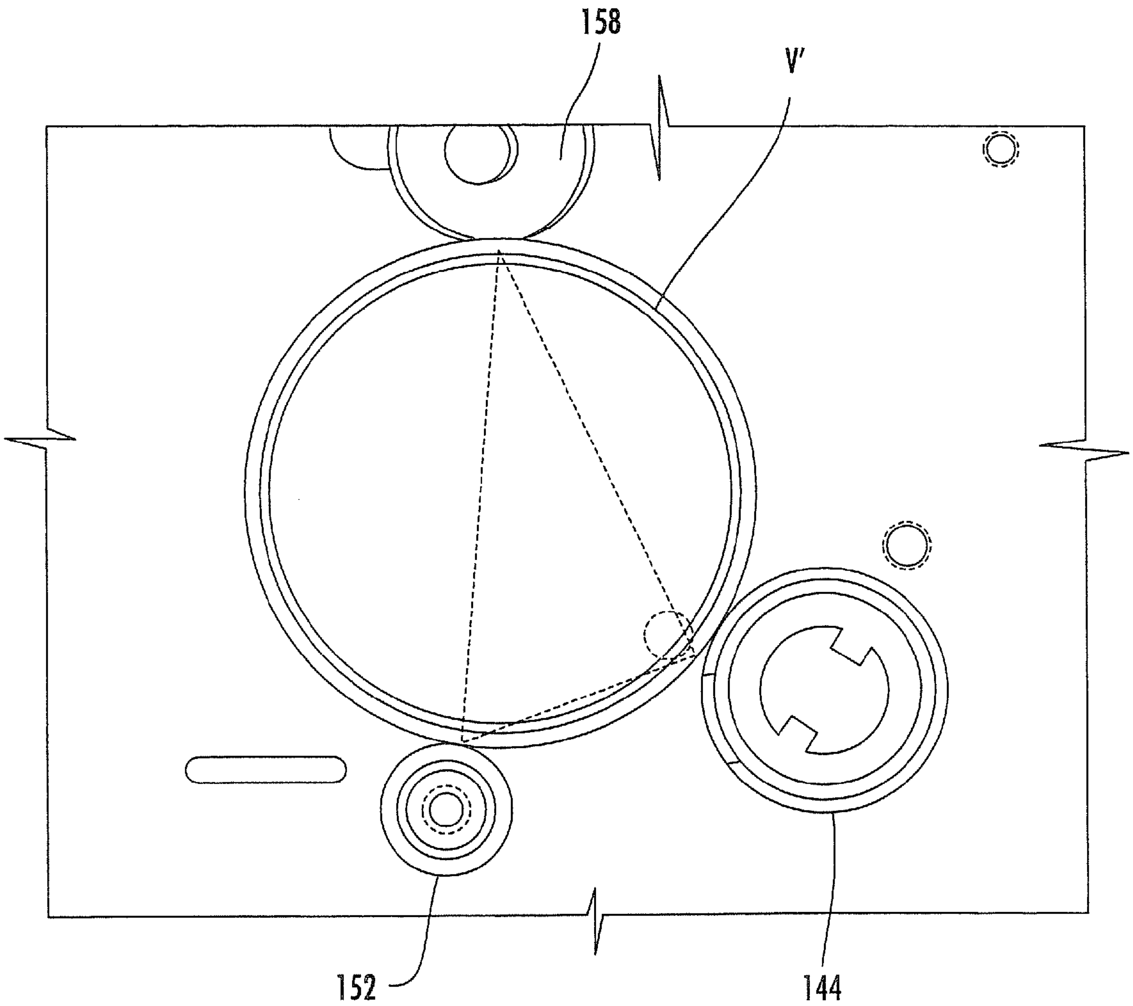

Because vials of different sizes may be presented to the labeling assembly 139, the locations of the drive roller and idler roller units 140, 146 and the swing idler wheel unit 150 may be selected to handle different vial sizes. In the illustrated embodiment, the label gap 149 is selected such that the smallest vial to be presented cannot slip through the gap 149 (see vial V in FIG. 11); typically, the gap 149 is between about 1 and 2 inches in width. Also, in the illustrated embodiment the location of the swing idler wheel unit 150 is selected so that the idler wheel 158 can contact a vial (a) at a height below that of the uppermost edge of the drive roller 144, and (b) at an angle at which the shaft 152 and the idler wheel 158 are canted toward the vial, which tend to apply a downward force on the vial to maintain it on the base plate 106 during subsequent rotation of the vial as described below. Moreover, the position of the idler wheel unit 150 may be selected to ensure that, for the largest vial to be presented to the labeling assembly 139, the lines drawn between the contact points of the rollers 144, 148 and the wheel 158 are on opposite sides of the center of the vial so that the vial does not "squirt" away from the rollers 144, 148 and the wheel 158 when the wheel 158 applies a radially inward force (see vial V' in FIG. 12).

Figure 15:
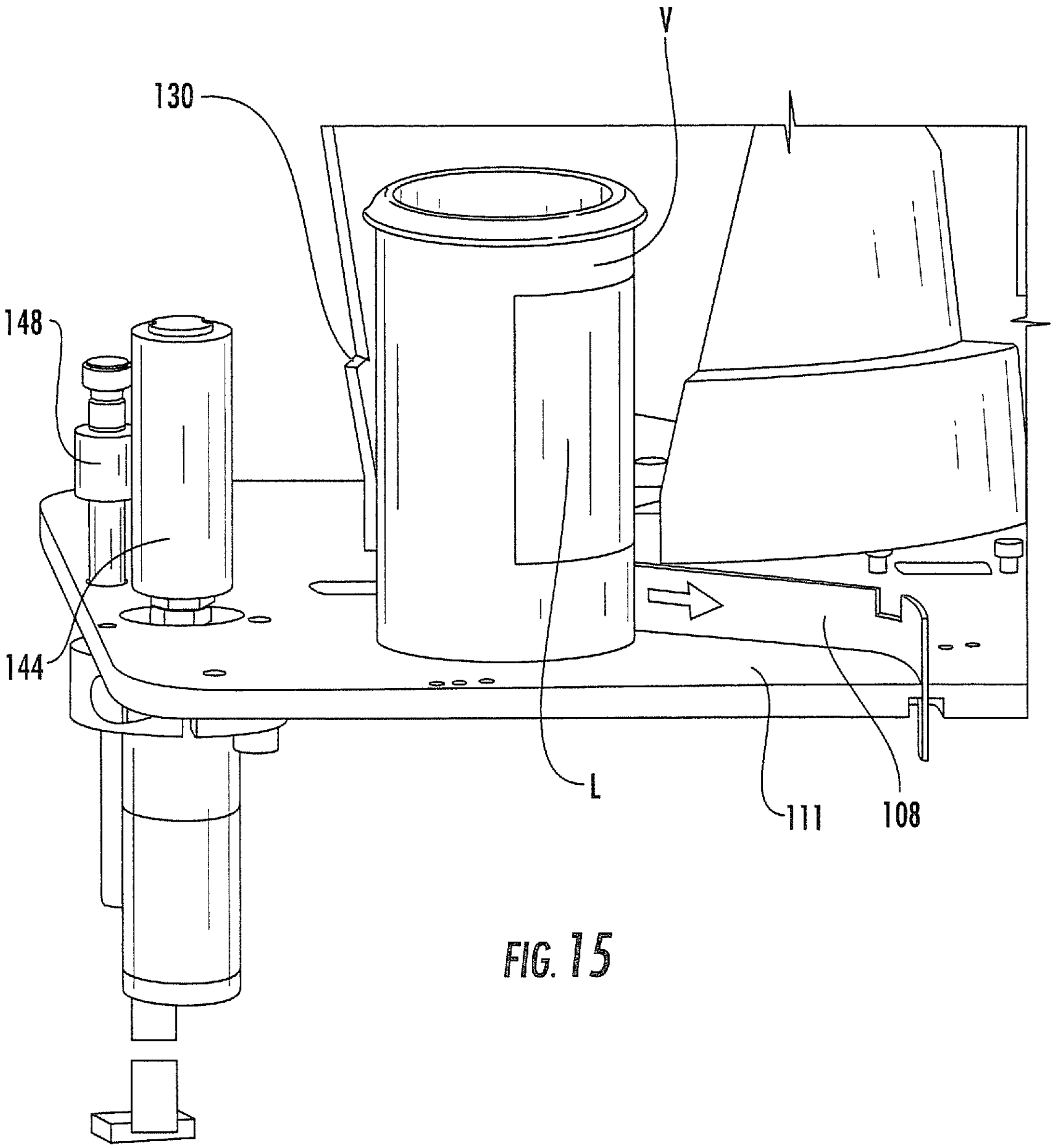
FIG. 15 is a side perspective view of the pick-up station of the vial labeling station of FIG. 4.

Referring now to FIG. 15, the pick-up area 111 includes the exit guide 108 and the portion of the baseplate 106 adjacent thereto. The exit guide 108 is routed from the labeling section 138 to the pick-up area 111, where the carrier 70 can retrieve a labeled vial for subsequent filling and capping. In some embodiments, the exit guide 108 is of sufficient length that it extends beyond the diameter D defined by the rotating index member 116 (see FIGS. 7 and 16).

Figure 10:
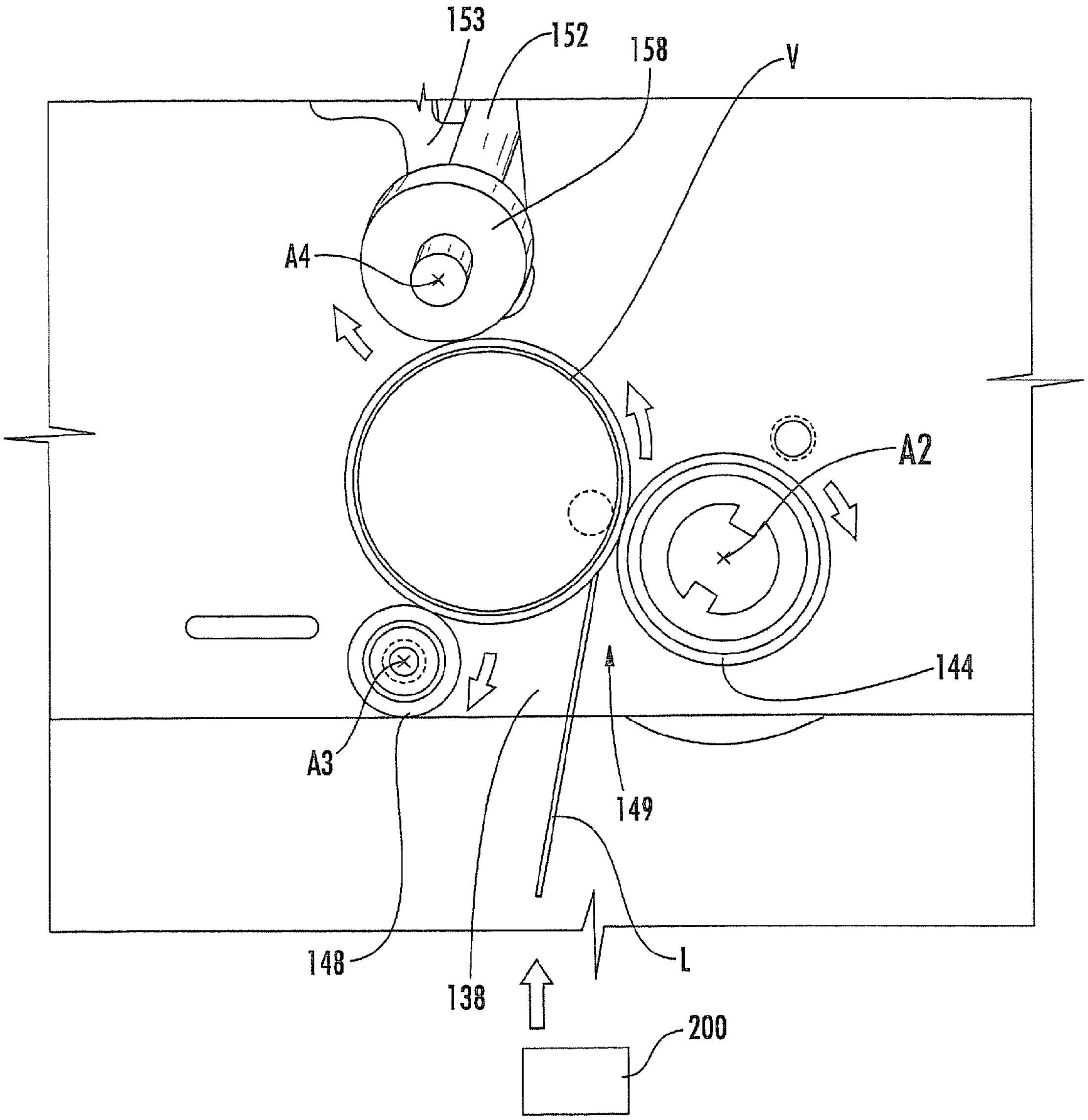
FIG. 10 is a top view of the labeling section of the labeling station of FIG. 8.

In operation, the labeling station 100 begins with the index member 116 in the position shown in FIG. 4 (i.e., with the compartments 120, 122 facing the drop guide 107) and the swing idler wheel 158 in a retracted position such as that shown in FIG. 10. The controller 42 receives an order for a prescription and signals a vial dispenser 190 (FIG. 4), such as that discussed in application Ser. No. 11/599,529 referenced above, to dispense a vial of a desired size. If a small vial is desired (as is represented in FIG. 4 by the vial V), it is deposited into the small vial compartment 122. Conversely, if a large vial is desired, it would be deposited in the large vial compartment 120. The ensuing discussion will focus on the deposition of a small vial in the small vial compartment 122; those skilled in this art will appreciate that the discussion is equally applicable to the labeling and pick-up of a large vial also.

Notably, the presence of the beveled upper surface 124 in the small vial compartment 122 encourages the vial V presented to the compartment 122 to enter the compartment 122 (see FIG. 6). In the illustrated embodiment, vials V are deposited in the large vial compartment 122 with their open ends facing upwardly and their closed ends on the surface of the base plate 106 within the large vial compartment 122.

Once the vial V has entered the small vial compartment 122, the controller 42 signals the index motor 112, which activates and rotates the index member 116 about the axis A1 (counterclockwise from the vantage point of FIG. 4). The controller 42 generates the signal based on a predetermined duration after the vial V is dropped by a mechanism within the vial dispenser 190; alternatively, proximity or optic sensors or other detectors may be employed. As the index member 116 rotates, the lagging edge portion 129 contacts the vial V and pushes it along the base plate 106 to the labeling section 138 (see FIG. 6). Notably, the chamfered surface 126 tapers away from the upper end of the vial V so that any lip or other structure (such as a tamper-proof edge or the like) does not contact the wall of the compartment 122; this arrangement can facilitate smooth sliding of the vial V in a stable, untipped condition when pushed by the index member 116.

Once the index member 116 pushes the vial V to the labeling section 138, the index motor 112 ceases, thereby stopping the index member 116. The cessation of rotation can be initiated by a sensor in the labeling assembly 139, a timer, an encoder, or the like. In this position, the cutout 134 is positioned in front of the swing idler wheel shaft 152. Then, based on a duration lapse, a counter in the motor 112, or the like, the controller 42 actuates the rotary solenoid 156 to rotate the shaft 152 of the swing idler wheel unit 150 about the axis A5 (counterclockwise from the vantage point of FIG. 9) through the cutout 134 in the index member 116. The shaft 152 rotates until the idler wheel 158 contacts the side wall of the vial V, thereby forcing the vial V against the idler roller 148 and the drive roller 144. This motion can be controlled with a torque sensor, a position sensor, or the like. It may be desirable for the swing idler wheel 158 to exert a force on the vial V in order to consistently seat the vial V within the rollers 144, 148 and the wheel 158. The angle α formed by the shaft 152 relative to the base plate 106 is typically between about 25 and 45 degrees, which angle can force the vial downwardly during application of a label.

After the vial V is engaged by the rollers 144, 148 and the wheel 158, after a short predetermined duration the controller 42 signals the motor 142 of the drive roller unit 140 to rotate the drive roller 144 about the axis A2 (rotation is clockwise from the vantage point of FIG. 10). Also, the controller 42 signals a label source, such as the illustrated label printer 200, to print and present a label L (FIG. 10) for application to the vial V. In some embodiments, it may be desirable to initiate rotation of the drive roller 144 prior to the presentation of the label L, as rotation of the vial V may allow a vial that is not seated flush on the base plate 106 to adjust to a flush condition. In the illustrated embodiment, the label L is presented into the label gap 149 adjacent the drive roller 144; in some embodiments, it may be desirable to present the label L at an angle such that the leading edge of the label L meets the vial V generally tangentially and/or at the interface between the roller 144 and the vial V. The label L has an adhesive applied to the surface thereof that faces the side wall of the vial V and therefore adheres thereto. The rotation of the drive roller 144 causes the vial V to rotate (counterclockwise from the vantage point of FIG. 10), which rotation draws the label L onto the side wall of the vial V. The label L passes through the nip between the vial V and the drive roller 144 such that the label L is smoothly applied to the rotating vial V. As the vial V rotates, it is maintained in place by the idler roller 148 and the swing idler wheel 158, each of which passively rotates as the vial V is driven by the drive roller 144.

Figure 13:
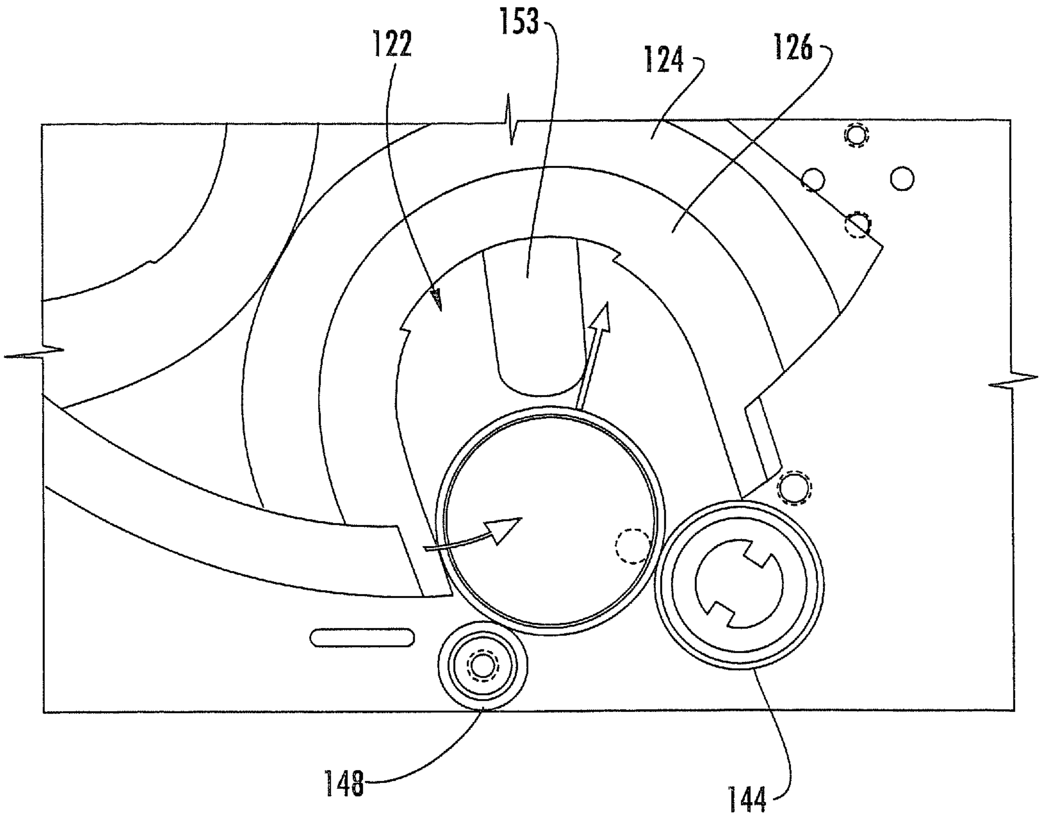
FIG. 13 is a top view of the labeling section of FIG. 8 showing how the positions of the rollers influence the exit direction of the vial.
Figure 14:
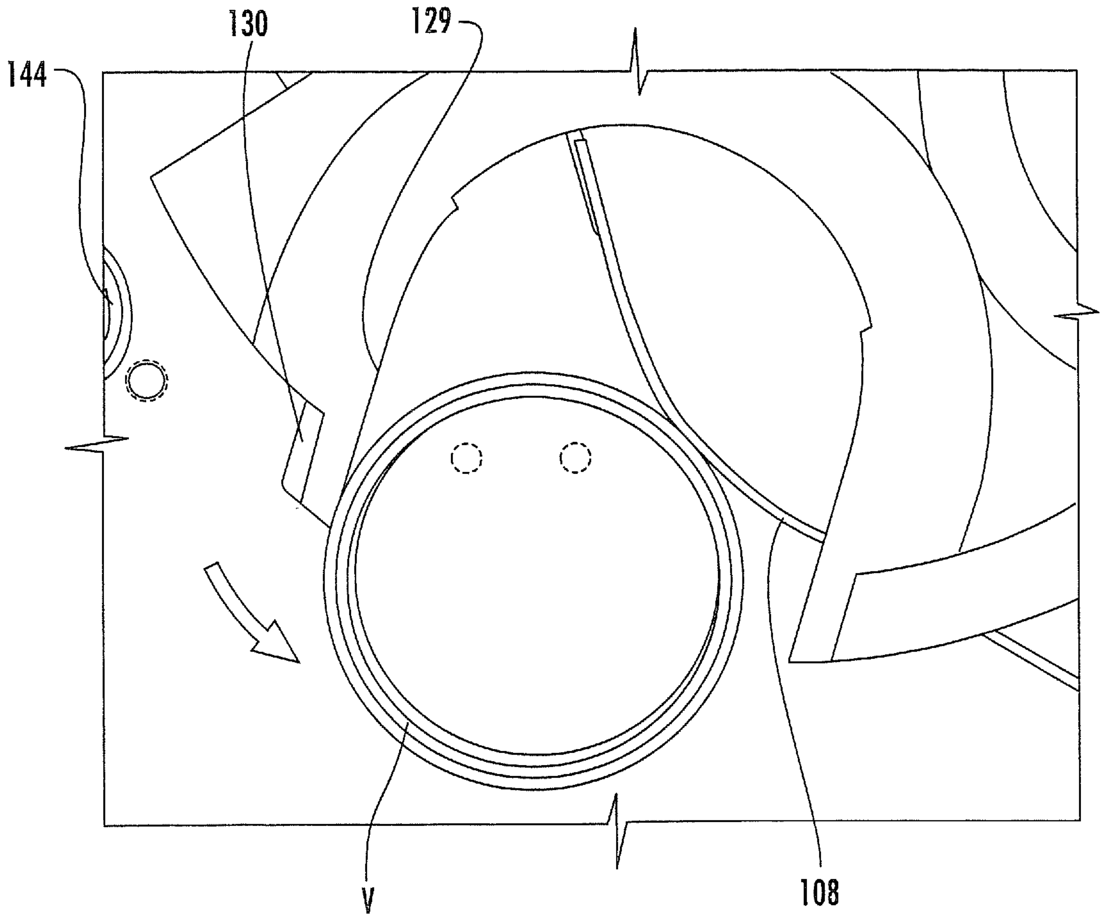
FIG. 14 is a top view of the labeling and pick-up stations of the vial labeling station of FIG. 4 showing the interaction between the index member, a vial, and the exit guide.

Once the label L has been completely applied to the vial V, the controller 42, typically based on a predetermined elapsed time period, signals the solenoid 156 to retract the swing idler wheel 158 back through the cutout 134. Shortly afterward, the controller 42 also signals the index motor 112 to rotate the index member 116 (counterclockwise from the vantage point of FIG. 13). The lagging edge 129 of the small vial compartment 122 pushes the vial V initially in a direction normal to the surface of the drive roller 44, which enables the vial V to reach and travel along a path defined by the exit guide 108 to the pick-up area 111. Notably, the stepped profile 130 of the lagging edge portion 129 of the compartment 122 enables the lagging edge portion 129 to avoid the lip of the vial V as it is being pushed along the exit guide 108. The exit guide 108 extends beyond the reach of the index member 116 (i.e., outside the diameter D defined by the rotating index member 116), such that the vial V travels along the exit guide 108 a sufficient distance to allow the index member 116 to rotate out of the way prior to the entry of the carrier 70 into the pick-up area 111 to retrieve the labeled vial V.

Figure 16:
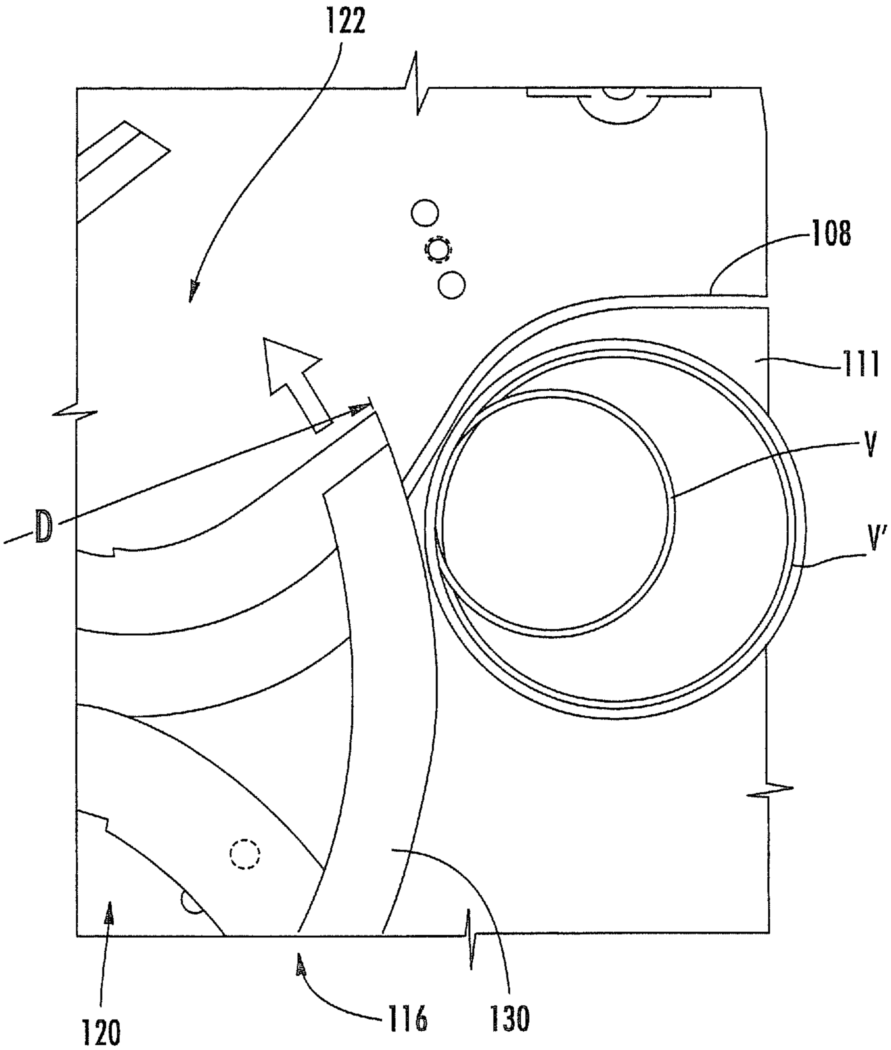
FIG. 16 is a top view of the pick-up station of FIG. 15 showing the relative positions of large and small diameter vials.

Referring now to FIG. 16, it can be seen that vials of different diameters (either a small vial V or a large vial V') can each reach the end of the exit guide 108 for pick-up by the carrier 70. Typically, the difference in location of the center of the vial based on its diameter can be addressed by the controller 42, which can alert the carrier 70 to the size of the vial so that the carrier 70 travels to the appropriate location for pick-up.

Those skilled in this art will recognize that components described above may be present in other forms in alternative embodiments of the present invention. For example, the index member assembly 110 may include an index member that revolves around a non-circular endless path rather than rotating about a stationary axis or that moves along a linear path. The compartments 120, 122 of the index member 116 may have a different profile for the inner surfaces thereof, e.g., they may lack a beveled surface and/or a chamfered surface, or they may be smoothly conical. The compartments 120, 122 may be the same size. The index member may have only one compartment or may have more than two compartments (for example, it may have two compartments for large vials and two for small vials). The index member 116 may counter-rotate after depositing the labeled vial at the pick-up section 111 rather than continuing to rotate in the same direction, or the index member 116 may be configured such that the carrier 70 can retrieve the labeled vial without the index member 116 rotating out of the way. Further, in some embodiments, separate members may be employed for (a) conveying the vial from the point of vial dispensing to labeling and (b) conveying the labeled vial to the pick-up section. Other alternatives may be apparent to those skilled in this art.

In addition, the labeling assembly may be configured differently in alternative embodiments. For example, there may be multiple drive rollers, and/or more or fewer rollers. The label may be presented to the vial at a different angle and/or at a different location. The timing of various actions of the labeling assembly may be different (e.g., the drive roller may cease rotation before the index member 116 resumes its rotation after labeling occurs, or the signaling of the solenoid to retract the swing idler wheel may be based on parameters other than elapsed time). The swing wheel shaft may be stationary relative to the base, particularly if it is anticipated that only one vial size will be labeled, or may be rotated via components other than a rotary solenoid, such as a linear solenoid or a BTA actuator. Alternatively, the vial may be rotated by a turntable positioned below the vial rather than by rollers. The labels may be presented by a source other than a printer (e.g., they could be presented manually). Those skilled in this art will recognize other alternatives.

Further, pick-up of the labeled vial may vary in other embodiments. For example, the shape or length of the exit guide 108 may vary. Also, in some embodiments the carrier 70 may pick up the labeled vial from the labeling section if space permits. Other alternatives may also be suitable for use with the present invention.

In addition, although the labeling station 100 is illustrated and described herein as part of an overall pharmaceutical dispensing system, those skilled in this art will appreciate that the labeling station 100 may be employed as a stand-alone device, perhaps mounted on a bench-top, for labeling vials. Such a system may receive manually-fed vials and/or rely on manual pick-up.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A method of labeling a pharmaceutical vial, comprising the steps of:

(a) providing a common base with a generally planar upper surface, the generally planar upper surface having a receiving section, a labeling section, and a pick-up section;

(b) receiving a pharmaceutical vial from a vial dispenser in a receiving compartment of an index member, the receiving compartment being positioned above the receiving section;

(c) rotating the index member to slide the vial from the receiving section to the labeling section adjacent a labeling source;

(d) rotating the vial about its axis in the labeling section;

(e) applying a label presented by the labeling source to the rotating vial;

(f) sliding the labeled vial with the index member away from the labeling section to the pick-up section; and (g) removing the labeled vial from the pick-up section.

2. The method defined in claim 1,wherein the step of rotating the vial occurs after the step of rotating the index member to convey the vial to the labeling section ceases.

3. The method defined in claim 1,wherein step (b) further comprises dispensing a vial from a vial dispenser into the receiving compartment.

4. The method defined in claim 3, wherein the dispensing step comprises dropping the vial into the receiving compartment from a position above the receiving compartment.

5. The method defined in claim 1, wherein the base includes a guide between the labeling section and the pick-up section, and wherein the step of rotating the index member comprises sliding the vial into and along the guide during rotation of the index member until the vial resides outside the diameter defined by rotation of the index member.

6. The method defined in claim 1, wherein rotating the vial comprises rotating the vial with a drive roller and at least one idler roller.

7. The method defined in claim 6, wherein the idler roller is position-adjustable and configured to press against vials of varying diameters during rotation.

8. The method defined in claim 6, wherein step (c) comprises presenting the label to the vial between the drive roller and the idler roller.

9. The method defined in claim 6, wherein the at least one idler roller is two idler rollers.

10. The method defined in claim 1, wherein the index member includes a plurality of receiving compartments, and wherein the receiving compartments are of at least two different sizes.

11. The method defined in claim 1, further comprising repeating steps (b)-(f) with a second vial, the second vial being of a different diameter than the first vial.

* * * * *